United States Patent [19]

Colberg et al.

[11] Patent Number: 4,656,256
[45] Date of Patent: Apr. 7, 1987

[54] BENZOAZORESORCINOL DYES CONTAINING A QUATERNIZED AMINOALKYLENE OXYCARBONYL GROUP

[75] Inventors: Horst Colberg, Schifferstadt; Hans-Juergen Degen, Lorsch; Johannes P. Dix, Neuhofen, all of Fed. Rep. of Germany

[73] Assignee: BASF Aktiengesellschaft, Ludwigshafen, Fed. Rep. of Germany

[21] Appl. No.: 734,560

[22] Filed: May 16, 1985

[30] Foreign Application Priority Data

May 19, 1984 [DE] Fed. Rep. of Germany ....... 3418672

[51] Int. Cl.⁴ .................... C09B 29/01; C09B 29/033; C09B 29/12; C09B 44/06
[52] U.S. Cl. .................... 534/605; 534/603; 534/604; 534/612; 534/614; 534/615; 534/649; 534/683; 534/686; 534/688; 534/728; 534/730; 534/731; 534/774; 534/777; 534/828
[58] Field of Search ............... 534/603, 614, 683, 604, 534/605, 688, 612, 728, 777, 774, 828, 730, 731, 686, 649

[56] References Cited

U.S. PATENT DOCUMENTS

| | | | |
|---|---|---|---|
| 2,219,280 | 10/1940 | Graenacher et al. | 534/605 |
| 3,532,683 | 10/1970 | Sartori | 534/603 |
| 3,694,426 | 9/1972 | Doss | 534/612 |
| 3,862,929 | 1/1975 | Entschel et al. | 534/603 X |

FOREIGN PATENT DOCUMENTS 808713 2/1959 United Kingdom ............... 534/615

Primary Examiner—Floyd D. Higel
Attorney, Agent, or Firm—Oblon, Fisher, Spivak, McClelland & Maier

[57] ABSTRACT

Compounds of the formula

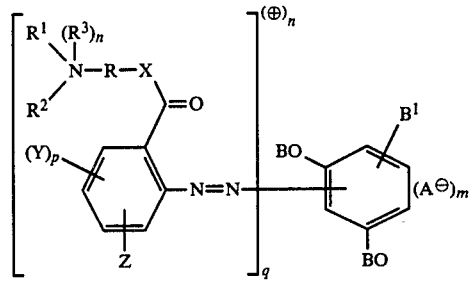

where Y is chlorine or bromine, Z is hydrogen, chlorine, bromine, a sulfonic ester group, nitro or unsubstituted or substituted sulfamyl, X is —O— or

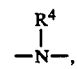

R is alkylene which may or may not be interrupted by oxygen,

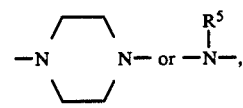

m is 1 or 2, n is 0 or 1, p is 0, 1 or 2, q is 1 or 2, $R^1$ and $R^2$ independently of one another are each hydrogen, unsubstituted or substituted alkyl, alkenyl, cycloalkyl, aralkyl or aryl, or $R^1$ and $R^2$, together with the nitrogen atom, form a heterocyclic structure, $R^3$ is hydrogen or unsubstituted or substituted alkyl, B is hydrogen or $C_1$–$C_4$-alkyl, $B^1$ is hydrogen, hydroxyl, $C_1$–$C_4$-alkoxy or $C_1$–$C_4$-alkyl, $A^-$ is an anion, $R^4$ is unsubstituted or substituted alkyl, $R_5$ is hydrogen or $C_1$–$C_4$-alkyl, and the radical

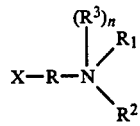

may furthermore be an unsubstituted or substituted piperazine radical, are useful for dyeing anionically modified fibers, leather, paper and printing inks.

18 Claims, No Drawings

BENZOAZORESORCINOL DYES CONTAINING A QUATERNIZED AMINOALKYLENE OXYCARBONYL GROUP

The present invention relates to compounds of the general formula (I)

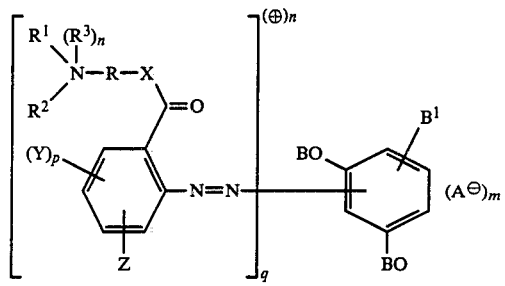

where Y is chlorine or bromine, Z is hydrogen, chlorine, bromine, a sulfonic ester group, nitro or unsubstituted or substituted sulfamyl, X is —O— or

R is alkylene which may or may not be interrupted by oxygen,

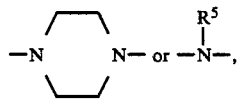

m is 1 or 2, n is 0 or 1, p is 0, 1 or 2, q is 1 or 2, $R^1$ and $R^2$ independently of one another are each hydrogen, unsubstituted or substituted alkyl, alkenyl, cycloalkyl, aralkyl or aryl, or $R^1$ and $R^2$, together with the nitrogen atom, form a heterocyclic structure, $R^3$ is hydrogen or unsubstituted or substituted alkyl, B is hydrogen or $C_1$–$C_4$-alkyl, $B^1$ is hydrogen, hydroxyl, $C_1$–$C_4$-alkoxy or $C_1$–$C_4$-alkyl, $A^\ominus$ is an anion, $R^4$ is unsubstituted or substituted alkyl, $R_5$ is hydrogen or $C_1$–$C_4$-alkyl, and the radical

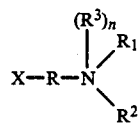

may further be an unsubstituted or substituted piperazine radical.

DETAILED DESCRIPTION OF THE PREFERRED EMBODIMENTS

Specific examples of radicals Z in addition to those stated above are:

$SO_2NH_2$, $SO_2NHCH_3$, $SO_2NHC_2H_5$, $SO_2NHC_3H_7$, $SO_2NHC_4H_9$, $SO_2NHC_6H_5$, $SO_2N(CH_3)_2$, $SO_2N(C_2H_5)_2$, $SO_2N(C_3H_7)_2$,

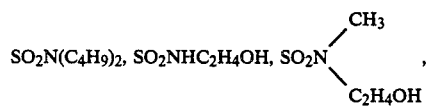

-continued $SO_2N(C_2H_4OH)_2$, $SO_2OCH_2CH_2N(CH_3)_2$, $SO_2OC_2H_4N(C_2H_5)_2$, $SO_2OC_2H_4N(C_4H_9)_2$, $SO_2OC_2H_4N(CH_2CH_2)_2O$, $SO_2OCH(CH_3)CH_2N(CH_3)_2$, $SO_2OCH(CH_3)CH_2N(C_2H_5)_2$, $SO_2OC_4H_8N(CH_3)_2$ and $SO_2OC_4H_8N(C_2H_5)_2$.

Z is particularly preferably hydrogen, chlorine or bromine.

Unsubstituted or substituted alkylene radicals R are, for example, of 2 to 10, preferably 2 or 3, carbon atoms. Specific examples are $C_2H_4$, $C_3H_6$, $\underset{CH_3}{CH}-CH_2$, $CH_2\underset{CH_3}{CH}$, $C_4H_8$, $\underset{C_2H_5}{CHCH_2}$, $C_6H_{12}$, $CH_2-\underset{\underset{CH_3}{|}}{\overset{\overset{CH_3}{|}}{C}}-CH_2$, $-\underset{\underset{CH_3}{|}}{\overset{\overset{CH_3}{|}}{C}}-CH_2-\underset{\underset{CH_3}{|}}{\overset{\overset{CH_3}{|}}{C}}-$, $C_2H_4OC_2H_4$, $C_3H_6OC_3H_6$, $C_3H_6OC_2H_4OC_3H_6$, $C_3H_6OC_4H_8OC_3H_6$, $C_3H_6OC_2H_4OC_2H_4OC_3H_6$, $C_2H_4NHC_2H_4$, $C_2H_4NHC_3H_6$, $C_3H_6NHC_3H_6$, $C_3H_6NHC_2H_4NHC_3H_6$, $C_3H_6NHC_6H_{12}NHC_3H_6$,

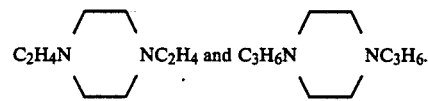

Alkyl radicals $R_1$ and $R_2$ are, as a rule, of 1 to 14 carbon atoms and can be substituted by, for example, N-cycloalkylamino, N,N-di-$C_1$–$C_5$-alkylamino, hydroxyl or $C_1$–$C_8$-alkoxy. Allyl, methallyl and $C_5$–$C_8$-cycloalkyl are further examples.

Specific examples of radicals in addition to those stated above are: methyl, ethyl, n-propyl, isopropyl, n-butyl, isobutyl, n-amyl, isoamyl, n-hexyl, isohexyl, heptyl, octyl, 2-ethylhexyl, decyl, dodecyl, tridecyl, tetradecyl, 2-hydroxyethyl, 2- and 3-hydroxypropyl, hydroxybutyl, cyclopentyl, cyclohexyl and cyclooctyl, N,N-dimethylaminoethyl, N,N-diethylaminoethyl, N,N-dipropylaminoethyl, N,N-dibutylaminoethyl, 3-(N,N-dimethylamino)-propyl, 3-(N,N-diethylamino)-propyl, 3-(N,N-dipropylamino)-propyl and 3-(N,N-dibutylamino)-propyl, N-cyclohexylaminoethyl, 3-(N-cyclohexylamino)-propyl, 3-(N-cyclooctylamino)-propyl, N-methyl-N-cyclohexylaminoethyl, 3-(N-methyl-N-cyclohexylamino)-propyl, benzyl, phenethyl, phenyl and tolyl.

$R^1$ and $R^2$, together with the nitrogen atom, can form, for example, radicals of the following heterocyclic compounds: pyrrolidine, piperidine, morpholine, piperazine, which may be substituted at the nitrogen by methyl, ethyl, n- or isopropyl, n-, iso- or sec.-butyl, 2-hydroxyethyl, 2-aminoethyl, 2- or 3-hydroxypropyl or 2- or 3-aminopropyl, imidazole, which may be substituted in the 2- and/or 4-position by methyl, ethyl, propyl or butyl, and N-3-($C_1$–$C_{12}$)-alkyl- or vinylimidazole which may be further substituted in the 2- and/or 4-position by methyl, ethyl, propyl or butyl.

Examples of preferred radicals $R^1$ and $R_2$ are methyl, ethyl, n-propyl, isopropyl, $C_2$ and $C_3$-hydroxyalkyl and cyclohexyl.

Preferred heterocyclic radicals

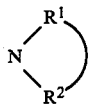

are, for example, those derived from morpholine, piperidine, 4-methylpiperazine, 4-ethylpiperazine, 4-hydroxyethylpiperazine, 4-(2'-aminoethyl)-piperazine, imidazole, 2-methylimidazole or 4-methylimidazole.

The radical

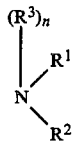

may furthermore be a group of the formula

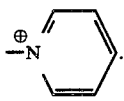

Examples of other suitable radicals $R^3$ are $C_1$–$C_{12}$-alkyl and $C_2$–$C_4$-hydroxyalkyl, such as methyl, ethyl, n- and isopropyl, n- and isobutyl, n- and isoamyl, n- and isohexyl, octyl, 2-ethylhexyl, decyl, dodecyl, 2-hydroxyethyl, 2- or 3-hydroxypropyl or hydroxybutyl, and benzyl, $CH_2CH(OH)CH_2Cl$ and $CH_2CH(OH)CH_2OH$.

$R^3$ is preferably $C_1$–$C_4$-alkyl, $C_2$–$C_4$-hydroxyalkyl or benzyl, particularly preferably methyl, ethyl or $C_2$ or $C_3$-hydroxyalkyl.

$R^4$ is preferably $CH_3$, $C_2H_5$ or $C_2H_4OH$.

B and $B^1$ are each preferably hydrogen, and B is also preferably methyl, the radicals B being independent of one another.

Examples of anions $A^-$ are chloride, bromide, bisulfate, sulfate, nitrate, phosphate, hydrogen phosphate, dihydrogen phosphate, carbonate, bicarbonate, tetrachlorozincate, aminosulfonate, methylsulfonate, methylsulfate, ethylsulfate, formate, acetate, hydroxyacetate, aminoacetate, methoxyacetate, propionate, lactate, maleate, malonate, citrate, benzoate, phthalate, benzenesulfonate, toluenesulfonate, oleate and dodecylbenzenesulfonate.

The compounds of the formula I can be prepared, for example, by diazotizing an amine of the formula II

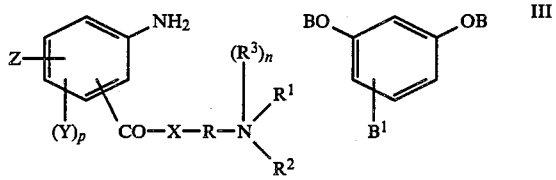

and reacting the product with a coupling component of the formula III.

The Examples which follow illustrate the preparation.

The compounds of the formula I are useful for dyeing acid-modified fibers, such as polyacrylonitrile or polyesters, leather and in particular paper. Furthermore, paper, in particular, can be printed with printing inks containing aqueous solutions of addition salts of I with acids. In the form of the bases or salts with fairly long-chain carboxylic or sulfonic acids, eg. oleic acid or dodecylbenzensulfonic acid, they are also suitable, for example, for pastes for ballpoint pens, as solvent dyes or for non-aqueous printing inks. In the form of addition salts with acids providing appropriate anions, the dyes are also readily soluble in water and organic solvents, so that they are useful for the preparation of liquid concentrates.

Of particular importance are compounds of the formula Ia

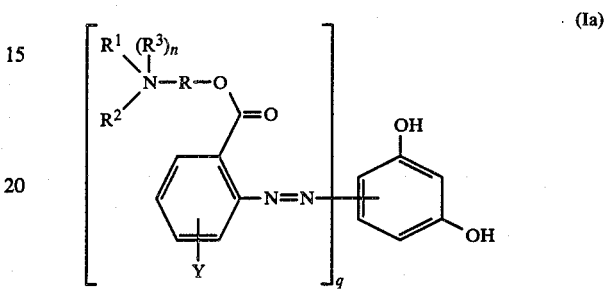

where R, $R^1$, $R^2$, $R^3$, n, q and Y have the stated meanings.

In this formula, Y is preferably hydrogen or nitro, and R is preferably $C_2H_4$, $C_3H_6$, $—CH(CH_3)CH_2$ or $C_4H_8$ $R^1$ and $R^2$ are each preferably H, $CH_3$, $C_2H_5$, n— or i—$C_3H_7$, n—, i— or sec.—$C_4$—$H_9$, $C_2H_4OCH_3$,

or cyclohexyl, and $R^3$ is preferably $CH_3$, $C_2H_5$ or $C_2H_4OH$.

In the Examples which follow, parts and percentages are by weight, unless stated otherwise.

EXAMPLE 1

Preparation of the diazo component:

187 parts of dimethylaminoethanol are added dropwise to 326 parts of isatoic anhydride in 1,000 parts of dioxane at 60° C., and the mixture is stirred for 1 hour, evaporated down under reduced pressure from a water pump and distilled under greatly reduced pressure. 402 parts of 2'-dimethylaminoethyl anthranilate pass over at 160° C./0.1 mm Hg.

21 parts of the above product are dissolved in a mixture of 50 parts of water, 25 parts of glacial acetic acid and 30 parts of concentrated hydrochloric acid, the solution is cooled to 5° C., and 34.6 parts of a 23% strength aqueous solution of sodium nitrite are then added dropwise. After 3 hours, excess nitrite is destroyed by adding amidosulfonic acid. A solution of 11 parts of resorcinol in 30 parts of warm water is then added, the pH is brought to 5 with sodium acetate and stirring is then continued overnight at room temperature. The mixture is cooled to 0° C., after which the pH is slowly brought to 7 with 5N sodium hydroxide solution. After 4 hours, the resulting dye has crystallized completely and can be filtered off under suction and washed with water. Drying in the air gives 22 g of dye powder. The dye can be dissolved in glacial acetic acid and water to give a stable 20% strength liquid formulation. It dyes paper stock yellow, the hue corresponding to No. 4 in the Color Index Hue Indication Chart. The effluent is only slightly colored. The dyed papers can be bleached with hydrosulfite. The dissolved compound is of the formula

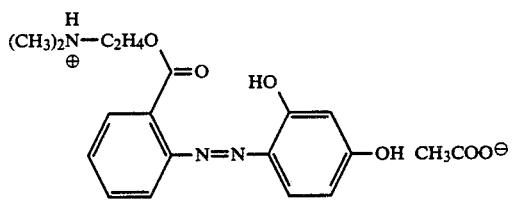

Further dyes can be prepared by a method similar to that described, the hue and the affinity to paper stock corresponding substantially to those of Example 1.

| Example No. | $-R-NR^1R^2$ |
|---|---|
| 2 | $-C_2H_4N(CH_3)_2$ |
| 3 | $-C_2H_4N(C_2H_5)_2$ |
| 4 | $-C_2H_4N(C_3H_7)_2$ |
| 5 | $-C_2H_4N(CH(CH_3)_2)_2$ |
| 6 | $-C_2H_4N(C_4H_9)_2$ |
| 7 | $-C_2H_4N(CH_2CH(CH_3)_2)_2$ |
| 8 | $-C_2H_4N(CH(CH_3)C_2H_5)_2$ |
| 9 | $-C_2H_4NHCH_3$ |
| 10 | $-C_2H_4NHC_2H_5$ |
| 11 | $-C_2H_4N(CH_2)_5$ |
| 12 | $-C_2H_4N(CH_2)_6$ |
| 13 | $-C_2H_4N\text{-morpholino}$ (O) |
| 14 | $-C_2H_4N\text{-piperazino}$ (NH) |
| 15 | $-C_2H_4N\text{-(4-methylpiperazino)}$ (N—CH₃) |
| 16 | $-C_2H_4N\text{-(4-ethylpiperazino)}$ (N—C₂H₅) |
| 17 | $-C_2H_4NH\text{-cyclohexyl}$ |
| 18 | $-C_2H_4N\text{-pyrrolyl(=N)}$ |
| 19 | $-C_2H_4N(C_2H_4OCH_3)_2$ |
| 20 | $-C_2H_4N(C_2H_4OC_2H_5)_2$ |
| 21 | $-CH(CH_3)-CH_2-N(CH_3)_2$ |
| 22 | $-CH(CH_3)-CH_2-N(C_2H_5)_2$ |
| 23 | $-CH(CH_3)-CH_2-N(C_3H_7)_2$ |
| 24 | $-CH(CH_3)-CH_2-N(CH(CH_3))_2$ (with CH₃) |
| 25 | $-CH(CH_3)-CH_2-N(C_4H_9)_2$ |
| 26 | $-CH(CH_3)-CH_2-N(CH_2-CH(CH_3)-CH_3)_2$ |
| 27 | $-CH(CH_3)-CH_2-N(CH(CH_3)CH_2CH_2)_2$ |
| 28 | $-CH(CH_3)-CH_2-NHCH_3$ |
| 29 | $-CH(CH_3)-CH_2-NHC_2H_5$ |

-continued

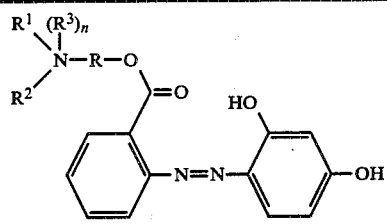

| Example No. | —R—NR$^1$R$^2$ |
|---|---|
| 30 | 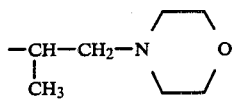 |
| 31 | 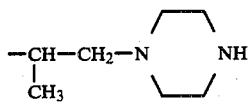 |
| 32 | 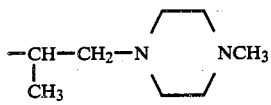 |
| 33 | 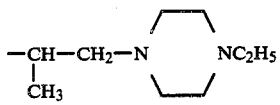 |
| 34 | 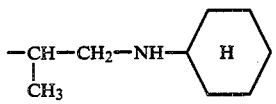 |
| 35 | 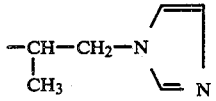 |
| 36 | 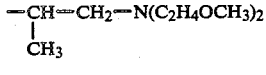 |
| 37 | —C$_3$H$_6$N(CH$_3$)$_2$ |
| 38 | —C$_3$H$_6$N(C$_2$H$_5$)$_2$ |
| 39 |  |
| 40 |  |
| 41 |  |
| 42 | 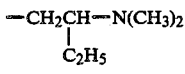 |
| 43 | 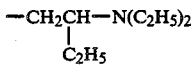 |

-continued

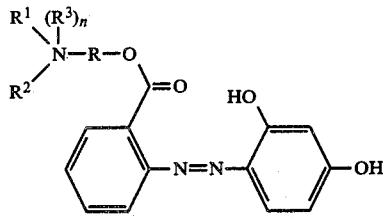

| Example No. | —R—NR$^1$R$^2$ |
|---|---|
| 44 |  |
| 45 |  |
| 46 | 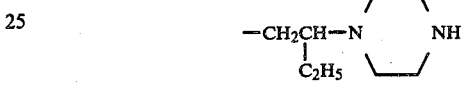 |
| 47 | 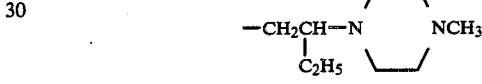 |
| 48 | —C$_4$H$_8$—N(CH$_3$)$_2$ |
| 49 | —C$_4$H$_8$—N(C$_2$H$_5$)$_2$ |
| 50 | —C$_4$H$_8$—N(C$_3$H$_7$)$_2$ |
| 51 |  |
| 52 | 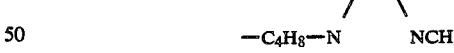 |
| 53 | 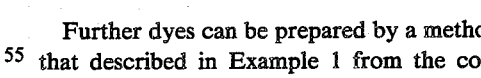 |

Further dyes can be prepared by a method similar to that described in Example 1 from the corresponding halogenated or sulfochlorinated derivatives of isatoic anhydride, the dyes obtained dyeing paper in a yellow hue corresponding to No. 4 in the Color Index Hue Indication Chart.

The yellow dyes below can be prepared by a method similar to that described in Example 61, using other aminoalcohols.

| Example No. | COOR-N(R¹)(R²)(R³)ₙ | Y | Z |
|---|---|---|---|
| 54 | COOC₂H₄N(CH₃)₂ | 5-Cl | H |
| 55 | COOC₂H₄N⌐O⌐ (morpholine) | 5-Cl | H |
| 56 | COOC₂H₄N(CH₃)₂ | 5-Br | H |
| 57 | COOC₂H₄N⌐O⌐ (morpholine) | 5-Br | H |
| 58 | COOC₂H₄N(CH₃)₂ | 3-Cl | 5-Br |
| 59 | COOC₂H₄N(CH₃)₂ | 5-Br | 3-Cl |
| 60 | COOC₂H₄N(CH₃)₂ | H | 5-SO₂OC₂H₄N(CH₃)₂ |

EXAMPLE 61

Diazo component:

187.2 parts of 5-nitroisatoic anhydride are introduced into a mixture of 600 parts of dioxane and 85 parts of N,N-dimethylethanolamine at 60° C. When evolution of gas is complete, the mixture is cooled to room temperature and is filtered, and the filtrate is stirred into a large amount of water. The precipitate is filtered off under suction and dried to give 125 parts of product. After the product has been recrystallized from aqueous ethanol, elemental analysis gives the following results (in percent):

$C_{11}H_{15}O_4N_3$ calculated C 52.2 H 6.0 O 25.3 N 16.6
found C 51.6 H 5.6 O 26.5 N 16.3

The diazotization equivalent is 261 g/equivalent (theoretical: 253 g/equivalent).

Diazotization and coupling to β-naphthol similarly to Example 1 gives a dye which, when used in aqueous solution containing acetic acid, dyes paper stock yellow. In acidic solution, the compound is of the formula

| Example No. | COOR-N(R¹)(R²)(R³)ₙ |
|---|---|
| 62 | COOC₂H₄N⌐O⌐ (morpholine) |
| 63 | COOC₂H₄N(C₂H₅)₂ |
| 64 | COOC₂H₄N⌐N—CH₃ (piperazine) |

EXAMPLE 65

Preparation of diazo component:

The diazo component prepared as described in Example 1 is distilled. 13 parts of dimethyl sulfate are added dropwise to 21 parts of the distillate in 100 parts of toluene at 60° C. Stirring is continued for one hour at this temperature, after which the mixture is cooled to room temperature and the precipitate is filtered off under suction and dried, the diazotization equivalent then being 355 g/equivalent (theoretical: 334 g/equivalent). The compound is of the formula

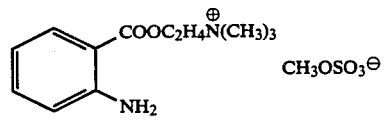

After diazotization and coupling similarly to Example 1, the mixture is rendered alkaline with sodium hydroxide solution, the aqueous phase is decanted from the greasy dye, and the latter is dissolved in aqueous glacial acetic acid. The dye dyes paper stock blue and gives a moderately colored effluent. The dye is of the formula

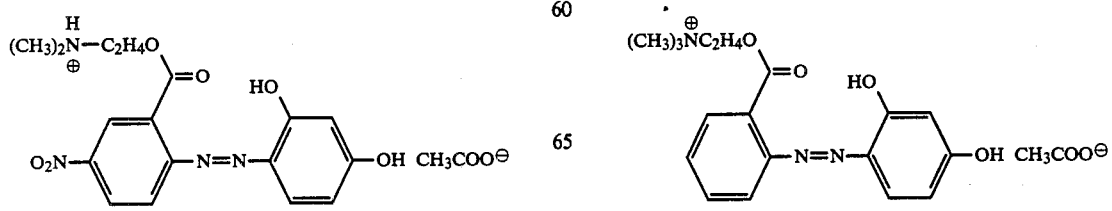

EXAMPLE 66

55 parts of a dye prepared as described in Example 1 and dried in the air are introduced into a solution of 55 parts of dodecylbenzenesulfonic acid and 100 parts of ethanol, the solution being at 70° C. The solution then contains the dye of the formula

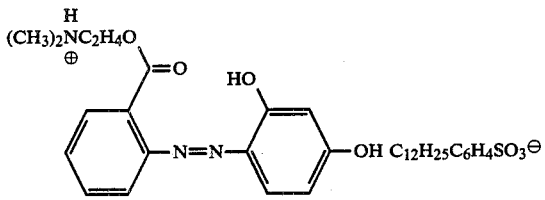

and can be used as a constituent of a flexographic printing ink.

EXAMPLE 67

55 parts of a dye prepared as described in Example 1 and dried in the air are introduced, together with 27 parts of magnesium oxide, into 250 parts of 1,2-dichloroethane. 20 parts of volume of dimethyl sulfate are added dropwise at 70° C., stirring is continued for ½ hour, and the product is then filtered off under suction and dried to give 93 parts of a powder which, in addition to extraneous salts, consists of the dye salt of the formula

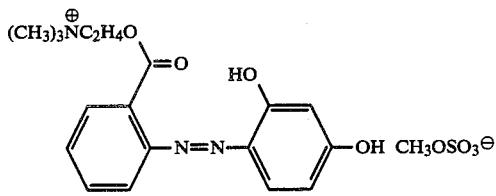

and dyes paper yellow when used in aqueous solution containing acetic acid.

EXAMPLE 68

292 parts of 2'-dibutylaminoethyl anthranilate are diazotized by a method similar to that described in Example 1. 55 parts of resorcinol are dissolved in 500 parts of warm water with the addition of 500 parts of isobutanol, and the solution is added to the diazonium salt solution. By adding a sodium carbonate solution, the pH is slowly increased to 0.8. The mixture is stirred overnight, after which the pH is brought to 6, and the organic phase is separated off and the isobutanol is distilled off. The residue, together with 260 parts of dodecylbenzenesulfonic acid, is dissolved in 300 parts of ethanol. The dissolved dye is of the formula

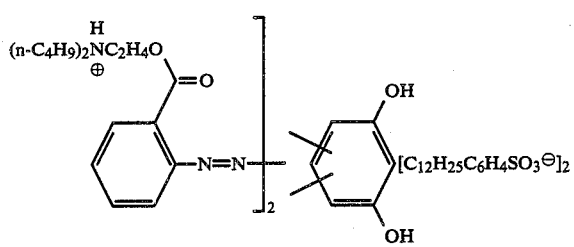

EXAMPLE 69

2 parts of a 10 percent strength solution of the dye from Example 1, containing acetic acid, are added to a suspension of 50 parts of bleached sulfate pulp of about 30° SR in 2,000 parts of water at pH 7. The mixture is stirred for 15 minutes at from 20° to 25° C., after which it is diluted with water to a solids content of 0.2%. This suspension is used to produce paper sheets on a laboratory sheet former, and the sheets are dried for 5 minutes at 100° C. Yellow sheets are obtained. The effluent is slightly colored, and the fastness to bleeding with respect to aqueous sodium carbonate solution is good. If, instead of bleached pulp, mechanical pulp is used, the effluent is still only slightly colored, and the fastness to bleeding with respect to water is good and that with respect to aqueous sodium carbonate solution is excellent. When the dyes from Examples 2–67 are used, similar dyeing results are obtained.

EXAMPLE 70

2.5 parts of the powder dye described in Example 6 are dissolved in a mixture of 10 parts of a styrene/maleate hard resin having a softening point of 160°–175° C., 16 parts of a 60 percent strength solution of a condensate obtained from tert.-butylphenol, formaldehyde and salicylic acid in a molar ratio of 1:1.4:0.8 in a 9:1 mixture of ethanol and ethylglycol, and 74 parts of a 9:1 mixture of ethanol and a mixture of about 98% of 1-methoxypropan-2-ol and 2% of 2-methoxypropan-1-ol. This solution can be used, for example, to print paper or aluminum foil in a reddish-yellow hue (No. 4, Color Index Hue Indication Chart).

A solution of 6.5 parts of the liquid dye from Example 68 in the amount of binder stated above can be used to print, for example, paper or aluminum foil in a yellowish brown hue (No. 5, Color Index Hue Indication Chart).

EXAMPLE 71

1.0 part of the product obtained by milling 90% of the dye from Example 1 and 10% of amidosulfonic acid is sprinkled into a stirred suspension of 100 parts of a mixture of 70% of bleached pine sulfate pulp and 30% of bleached birch sulfate pulp in 2,000 parts of water, the total pulp being of about 30° SR. The suspension is stirred for 10 minutes and then diluted to a solids content of 0.2% with water, and paper sheets are produced on a laboratory sheet former and dried for 5 minutes at 100° C. The sheets obtained exhibit a level yellow dyeing and good fastness to bleeding with respect to water. The use of the products obtained by milling the dyes from Examples 2–67 with amidosulfonic acid gives similar dyeing results, as does the use of addition salts with acids.

EXAMPLE 72

An absorptive paper web consisting of unsized paper is drawn, at 40°–50° C., through a dye solution composed of 0.5 part of the dye from Example 1, 0.5 part of starch, 3 parts of acetic acid and 96 parts of water. The excess dye solution is pressed out between two rollers. The dry paper web is found to be dyed yellow.

The dyes from Examples 2–67 can be employed in a similar manner.

We claim:
1. A compound of the formula

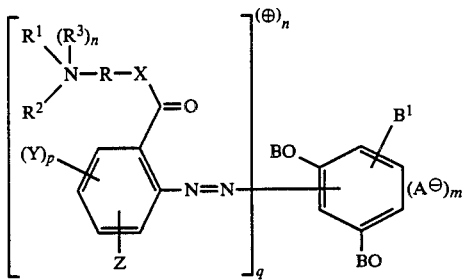

wherein:

Y is chlorine or bromine;

Z is hydrogen, chlorine, bromine, a sulfonic ester of the formula $-SO_2O-R^{11}-NR^{12}R^{13}$ where $R^{11}$ is a branched or a linear $C_{1-4}$ alkylene, and $R^{12}$ and $R^{13}$ are each independently $C_{1-4}$ alkyl or $NR^{12}R^{13}$ is $N(CH_2CH_2)_2O$; or Z is nitro, unsubstituted sulfamyl or a substituted sulfamyl of the formula $-SO_2-N-R^{14}R^{15}$, where $R^{14}$ and $R^{15}$ are each independently hydrogen, $C_{1-4}$ alkyl, phenyl or $-CH_2CH_2OH$; X is oxygen or $-NR^4-$, where $R^4$ is methyl, ethyl or $C_2H_4OH$;

R is $C_{2-10}$ alkylene, $C_{2-10}$ alkylene interrupted by oxygen, or $C_{2-10}$ alkylene interrupted by

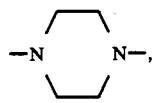

or $-NR^5-$ where $R^5$ is hydrogen or $C_{1-4}$ alkyl;

m = 1 or 2;

n = 0 or 1;

p = 0, 1 or 2;

q = 1 or 2;

$R^1$ and $R^2$ are each independently hydrogen, $C_{1-14}$ unsubstituted alkyl, $C_{1-14}$ alkyl substituted by N-cycloalkylamino, N,N-di-$C_1$-$C_5$-alkylamino, hydroxyl or $C_1$-$C_8$-alkoxy, or $R^1$ and $R^2$ are each independently allyl, methallyl, $C_5$-$C_8$-cycloalkyl, or $C_1$-$C_8$ aralkyl; or $NR^1R^2$ is pyrrolidine, piperidine, morpholine, piperazine, or pyrrolidine, piperidine, morpholine or piperazine substituted at nitrogen by methyl, ethyl, n-propyl, i-propyl, n-butyl, i-butyl, s-butyl, 2-hydroxyethyl, 2-aminoethyl, 2-hydroxypropyl, 3-hydroxypropyl, 2-aminopropyl or 3-aminopropyl, or $NR^1R^2$ is imidazole, or imidazole substituted at the 2- or 4-position by $C_{1-4}$ alkyl, or N-3-($C_1$-$C_{12}$)-alkyl imidazole, vinylimidazole or vinylimidazole substituted at the 2- or 4-position by $C_1$-$C_4$ alkyl;

$R^3$ is hydrogen, $C_1$-$C_4$-alkyl, $C_2$-$C_4$-hydroxy-alkyl, benzyl; or $X-R-N(R^3)_nR_1R_2$ is piperazine, 4-methylpiperazine, 4-ethylpiperazine, 4-hydroxyethylpiperazine, or 4-(2'-aminoethyl)piperazine or $N(R^3)_nR_1R_2$ is

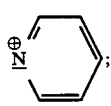

B is hydrogen or $C_1$-$C_4$-alkyl;

$B^1$ is hydrogen, hydroxyl, $C_1$-$C_4$-alkoxy or $C_1$-$C_4$-alkyl; and $A^-$ is chloride, bromide, bisulfate, sulfate, nitrate, phosphate, hydrogen phosphate, dihydrogen phosphate, carbonate, bicarbonate, tetrachlorozincate, aminosulfonate, methylsulfonate, methylsulfate, ethylsulfate, formate, acetate, hydroxyacetate, aminoacetate, methoxyacetate, propionate, lactate, maleate, malonate, citrate, benzoate, phthalate, benzenesulfonate, toluenesulfonate, oleate or dodecylbenzenesulfonate.

2. The compound of claim 1, said compound having the formula

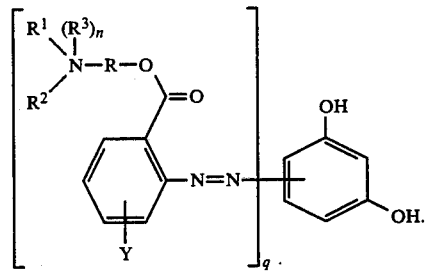

3. The compound of claim 1 wherein Z is $SO_2NH_2$, $SO_2NHCH_3$, $SO_2NHC_2H_5$, $SO_2NHC_3H_7$, $SO_2NHC_4H_9$, $SO_2N(CH_3)_2$, $SO_2N(C_2H_5)_2$, $SO_2N(C_3H_7)_2$, $SO_2N(C_4H_9)_2$, $SO_2NHC_2H_4OH$, $SO_2N(CH_3)CH_2CH_2OH$, $SO_2N(C_2H_4OH)_2$, $SO_2OCH_2CH_2N(CH_3)_2$, $SO_2OC_2H_4N(C_2H_5)_2$, $SO_2OC_2H_4N(C_4H_9)_2$, $SO_2OC_2H_4N(CH_2CH_2)_2O$, $SO_2OCH(CH_3)CH_2N(CH_3)_2$, $SO_2OCH(CH_3)CH_2N(C_2H_5)_2$, $SO_2OC_4H_8N(CH_3)_2$, or $SO_2OC_4H_8N(C_2H_5)_2$.

4. The compound of claim 1, where Z is hydrogen, chlorine or bromine.

5. The compound of claim 1, wherein R is $C_2$-$C_{10}$ alkylene.

6. The compound of claim 1, wherein R is $C_2$-$C_3$ alkylene.

7. The compound of claim 1, wherein R is $C_2H_4$, $C_3H_6$, $CH(CH_3)CH_2$, $CH_2CH(CH_3)$, $C_4H_8$, $CH(C_2H_5)CH_2$, $C_6H_{12}$, $CH_2C(CH_3)_2CH_2$, $C(CH_3)_2CH_2C(CH_3)_2$, $C_2H_4OC_2H_4$, $C_3H_6OC_3H_6$, $C_3H_6OC_2H_4OC_3H_6$, $C_3H_6OC_4H_8OC_3H_6$, $C_3H_6OC_2H_4OC_2H_4OC_3H_6$, $C_2H_4NHC_2H_4$, $C_2H_4NHC_3H_6$, $C_3H_6NHC_3H_6$, $C_3H_6NHC_2H_4NHC_3H_6$, $C_3H_6NHC_6H_{12}NHC_3H_6$, $C_2H_4N\ NC_2H_4$ or $C_3H_6N\ NC_3H_6$.

8. The compound of claim 1, wherein $R^1$ and $R^2$ are each independently (i) $C_1$-$C_{14}$ alkyl, (ii) $C_1$-$C_{14}$ alkyl substituted by N-cycloalkylamino, N,N-di-$C_1$-$C_5$-alkylamino, hydroxyl or $C_1$-$C_8$-cycloalkyl, or (iii) allyl, methallyl, or $C_5$-$C_8$-cycloalkyl.

9. The compound of claim 1, wherein $R^1$ and $R^2$ are each independently, methyl, ethyl, n-propyl, i-propyl, n-butyl, i-butyl, n-amyl, i-amyl, n-hexyl, i-hexyl, heptyl, octyl, 2-ethylhexyl, decyl, dodecyl, tridecyl, tetradecyl, 2-hydroxyethyl, 2-hydroxypropyl, 3-hydroxypropyl, hydroxybutyl, cyclopentyl, cyclohexyl, cyclooctyl, N,N-dimethylaminoethyl, N,N-diethylaminoethyl, N,N-dipropylaminoethyl, N,N-dibutylaminoethyl, 3-(N,N-dimethylamino)-propyl, 3-(N,N-diethylamino)-propyl, 3-(N,N-dipropylamino)-propyl, 3-(N,N-dibutylamino)-propyl, N-cyclohexylaminoethyl, 3-(N- cyclohexylamino)-propyl, 3-(N-cyclooctylamino)-propyl, N-methyl-N-cyclohexylaminoethyl, 3-(N-methyl-N-cyclohexylamino)-propyl, benzyl, phenethyl, phenyl, or tolyl.

10. The compound of claim 1, wherein $NR^1R^2$ is pyrrolidone, piperadine, morpholine, piperazine, or pyrrolidine, piperidine, morpholine or piperazine substituted at the nitrogen by methyl, ethyl, n-propyl, i-propyl, n-butyl, i-butyl, s-butyl, 2-hydroxyethyl, 2-aminoethyl, 2-hydroxypropyl, 3-hydroxypropyl, 2-aminopropyl, or 3-aminopropyl, or $NR^1R^2$ is imidazole or imidazole substituted at the 2- or 4-position by methyl, ethyl, propyl or butyl, or $NR^1R^2$ is N-3-($C_1$-$C_{12}$)-alkylimidazole, vinylimidazole or vinylimidazole substituted at the 2- or 4-position by methyl, ethyl, propyl or butyl.

11. The compound of claim 10, wherein $NR^1R^2$ comprises morpholine, piperidine, 4-methylpiperazine, 4-ethylpiperazine, 4-hydroxyethylpiperazine, 4-(2'-aminoethyl)piperazine, imidazole, 2-methylimidazole, or 4-methylimidazole.

12. The compound of claim 1, wherein $R^3$ is $C_1$-$C_{12}$ alkyl, $C_2$-$C_4$-hydroxyalkyl, benzyl, $CH_2CH(OH)CH_2Cl$, or $CH_2CH(OH)CH_2OH$.

13. The compound of claim 1, wherein $N(R^3)_nR^1R^2$ is 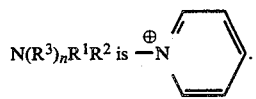.

14. The compound of claim 12, wherein $R^3$ is methyl, ethyl, n-propyl, iso-propyl, n-butyl, iso-butyl, n-amyl, iso-amyl, n-hexyl, iso-hexyl, octyl, 2-ethyhexyl, decyl, dodecyl, 2-hydroxyethyl, 2-hydroxypropyl, 3-hydroxypropyl or hydroxybutyl.

15. The compound of claim 1, wherein $R^3$ is $C_1$-$C_4$ alkyl group, $C_2$-$C_4$-hydroxyalkyl group, or benzyl.

16. The compound of claim 1, wherein $R^3$ is methyl, ethyl, $C_2$-hydroxyalkyl, or $C_3$-hydroxyalkyl.

17. The compound of claim 1, wherein $R^4$ is $CH_3$, $C_2H_5$ or $C_2H_4OH$.

18. The compound of claim 1, wherein B and $B^1$ are each independently hydrogen or methyl.

* * * * *